INVENTORS
ARTHUR H. LONG &
ALEXANDER SHASHATY
BY
THEIR ATTORNEY

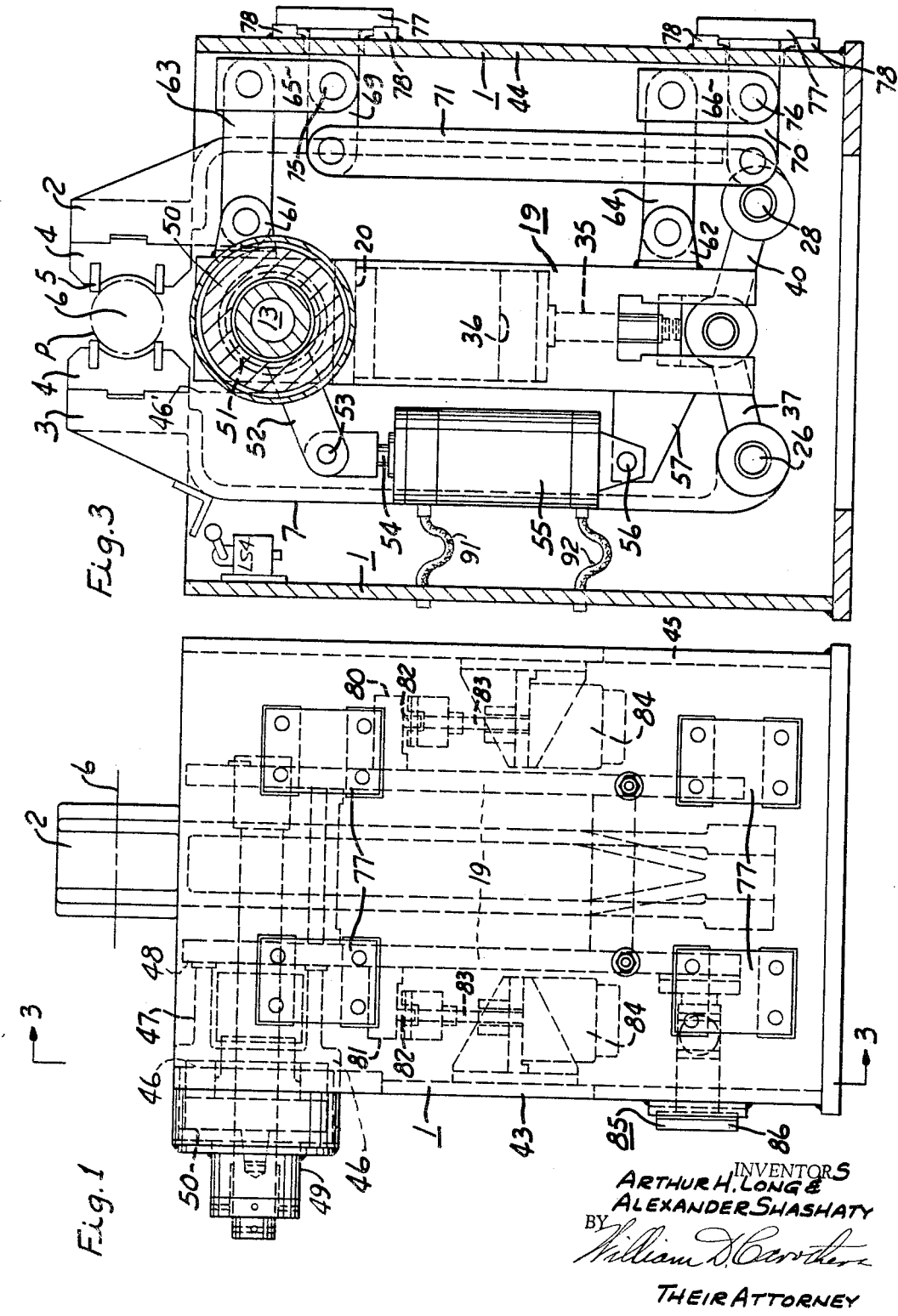

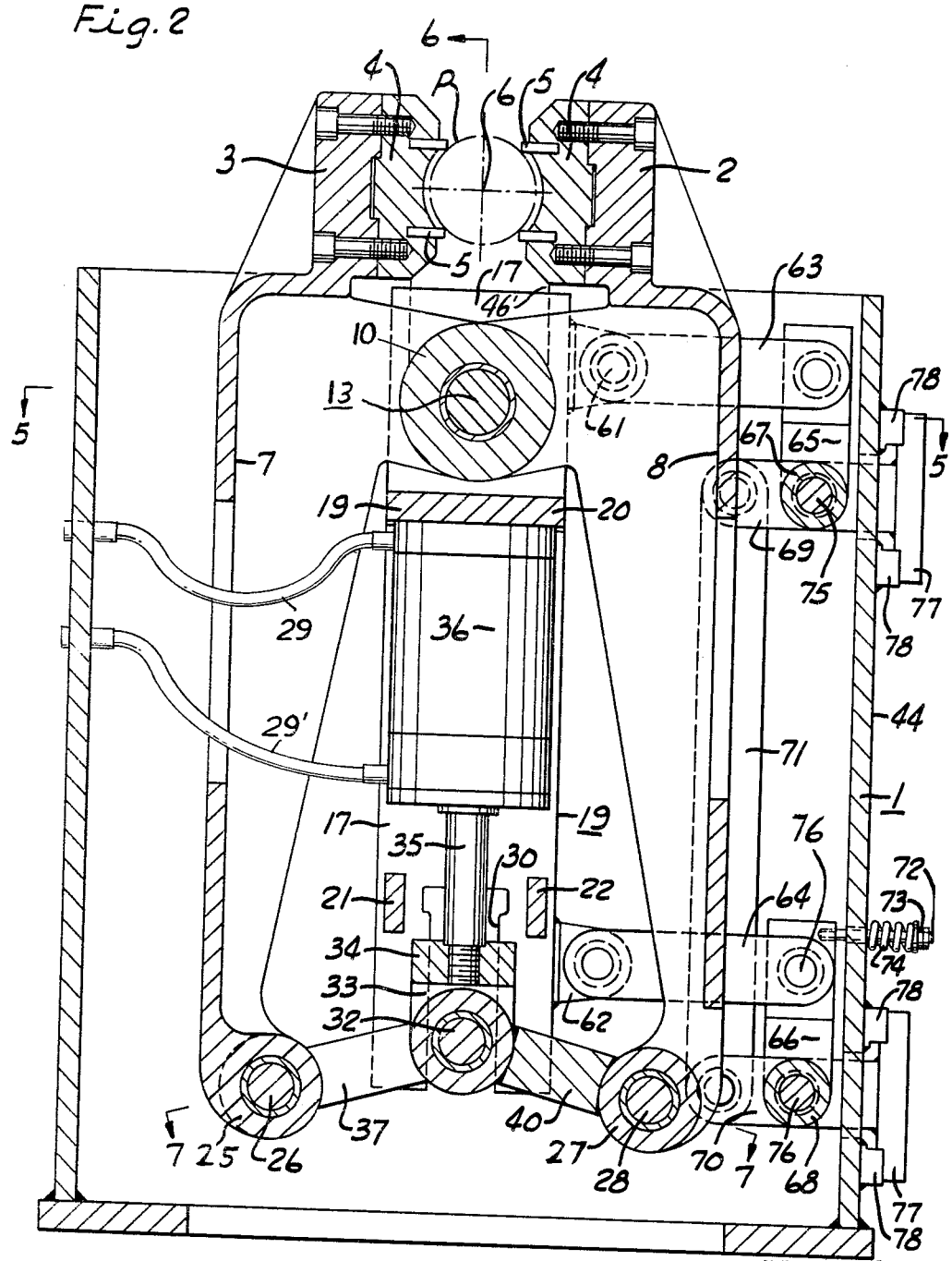

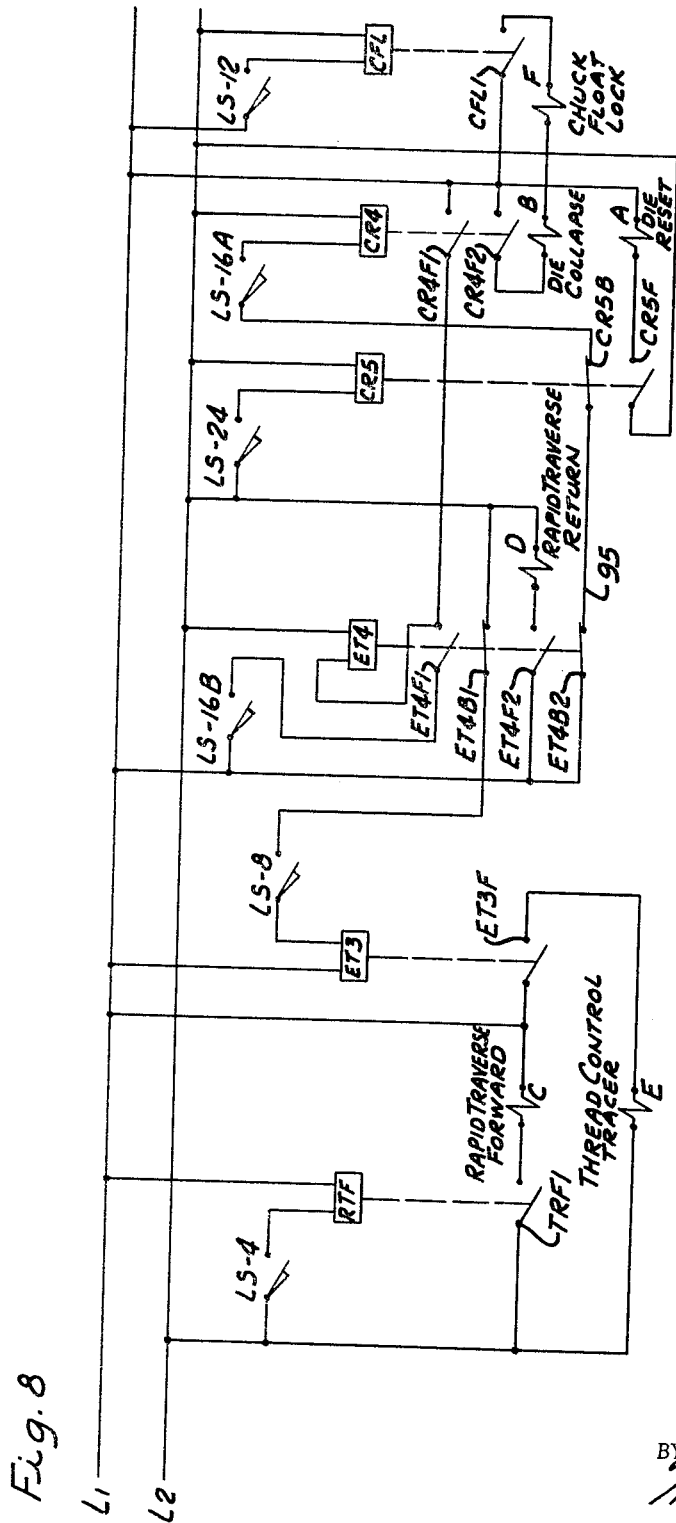

United States Patent Office 3,232,601
Patented Feb. 1, 1966

3,232,601
FLOATING CHUCK
Arthur H. Long, Columbiana, and Alexander Shashaty, Youngstown, Ohio, assignors to Wm. K. Stamets Company, Pittsburgh, Pa., a corporation of Pennsylvania
Filed Dec. 10, 1962, Ser. No. 243,521
9 Claims. (Cl. 269—30)

This invention relates generally to floating or self-centering chucks for use with threading or other machine tool operations and more particularly to floating chuck carrying a chuck jaw operating means and lock means.

Floating chucks are employed to support the work relative to the tool. The tool when initially engaging the work will center the work relative to the tool after which the work is locked in this position. Such a chuck is advantageously employed to support the workpiece that is to be threaded wherein the work is held by a floating or self-centering chuck until it has been properly centered by the tool itself, it is thereafter locked until the tool has completed its operation on the work.

The floating or self-centering chuck comprising this invention has been simplified and is provided with a counterbalance for supporting the weight of the chuck and the work so that it is more readily centered by the tool.

Another object is the provision of a simplified support linkage for the counterbalanced floating chuck which linkage may be preloaded to provide a rolled reactor force in aligning the work.

Another object is the provision of a power locking means for locking the chuck in its selected position and for withstanding the principle of the axial thrust of the cutting tool or chaser. This thrust resisting effort is opposed by a second axial thrust resisting member.

Another object is the provision of a floating or self-centering chuck frame supported for radial movement relative to a fixed horizontal axis which frame is guided by at least a pair of parallel links disposed on one side of the axis and connected to one set of parallel arms, a pair of bell cranks with their other arms disposed at 90° and connected by a thread link so as to provide a radial motion of the chuck relative to the fixed horizontal axis. One of the arms of the bell crank levers may be preloaded to provide reaction forces that induce a positive action of centering the chuck. Regardless of whether the chuck jaws are upwardly open or open outwardly to one side, the chuck frame may be counterbalanced to support the load of the whole of the chuck frame and the parts attached thereto together with the work such as the pipe held by the chuck jaws. Thus the chuck frame may be counterbalanced by a fluid actuated force and may be locked after the chuck has been centered and supported against axial thrust.

Other objects and advantages of this invention appear hereinafter in the following description and claims.

The accompanying drawings show for the purpose of exemplification without limiting this invention or the claims thereto, certain embodiments illustrating the principles of this invention wherein:

FIG. 1 is a view in side elevation of the floating chuck comprising this invention.

FIG. 2 is a view in vertical transverse section.

FIG. 3 is a view in vertical section taken on the line 3—3 in FIG. 1.

Referring to FIG. 1 the floating chuck is contained in the upwardly open frame 19 pivotally attached to the base or housing 1 which frame is preferably formed as an independent part of the base of the machine to which the floating chuck is to be associated so that the frame may be adjustably positioned on the machine base and removed as a unit.

Figure 5:
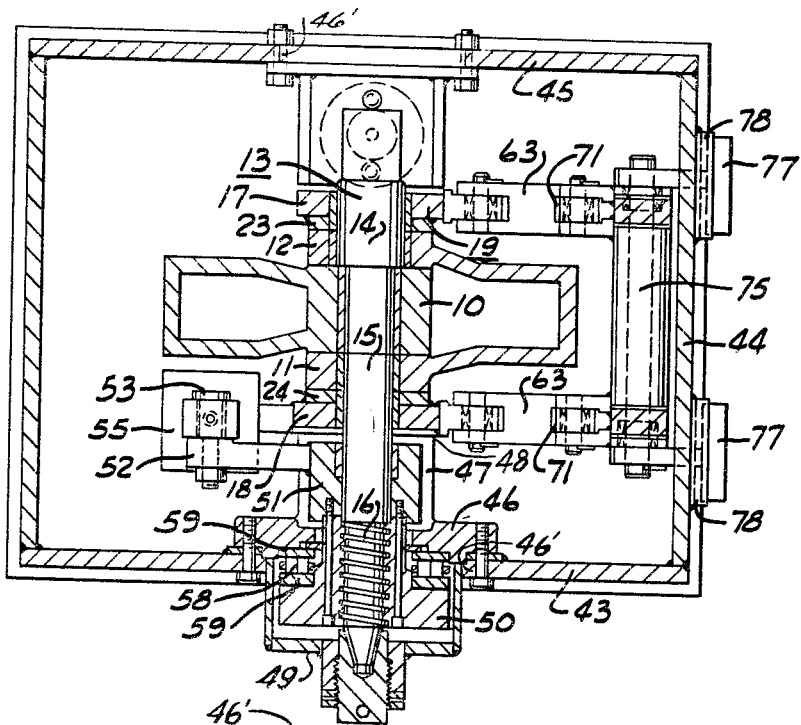
FIG. 5 is a view in horizontal section taken on line 5—5 of FIG. 2.
Figure 4:
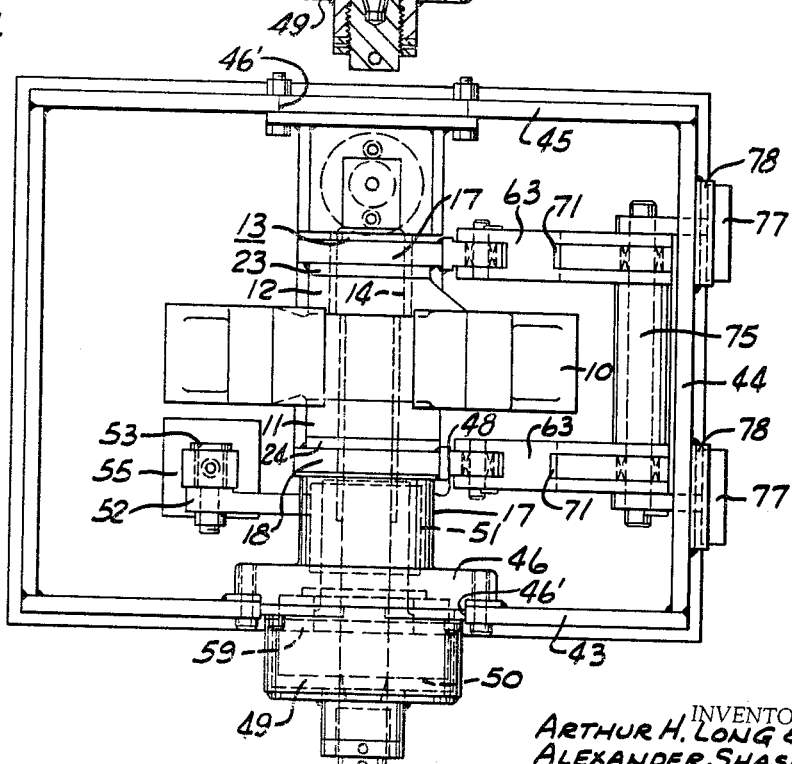
FIG. 4 is a top plan view of floating chuck comprising this invention.
Figure 6:
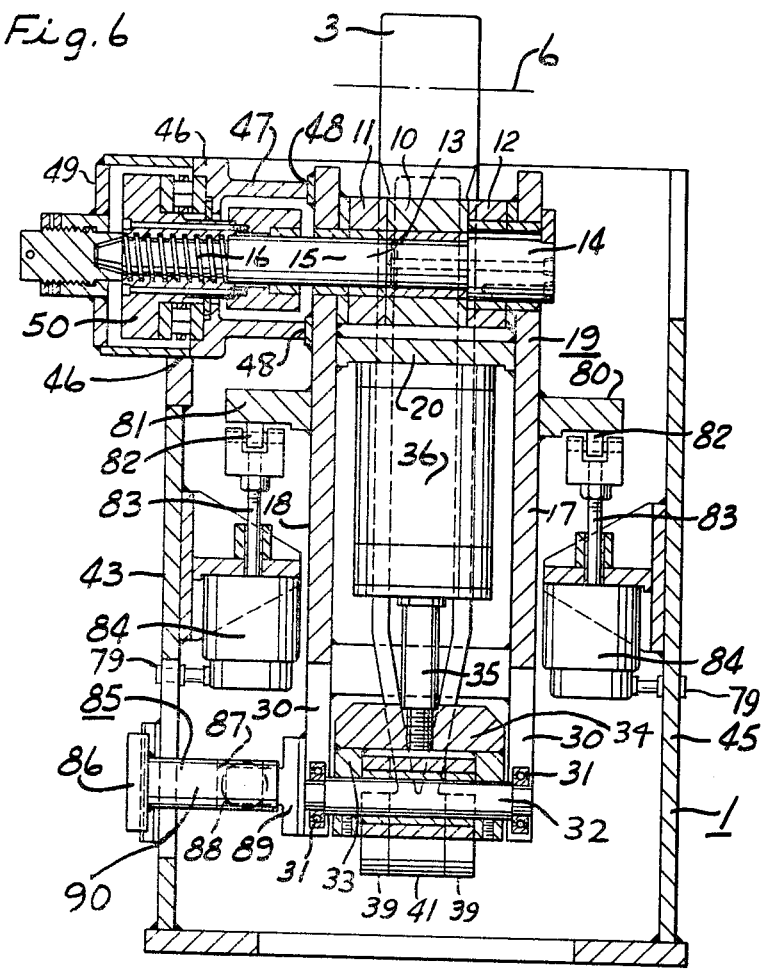
FIG. 6 is a view in vertical section taken on the line 6—6 of FIG. 2.

As shown in FIGS. 2 and 6 the jaw members 2 and 3 are pivotally mounted on the pin 13 carried on the frame 19. The jaws are provided with their removable clamp pads 4 having the outwardly extending grip members 5 that engage and hold the pipe as shown at P on the horizontal axis 6 which is adjusted radially relative to a fixed horizontal axis which as shown in the drawings is concurrent with the axis 6. The jaw members 2 and 3 are the top portion of the arms 7 and 8 respectively and have inwardly extending sections that carry the pivot collars 10 and 11, the collar 10 being positioned between the collar sections 11 and 12. The collars 10 and 11 are provided with sleeve bearings that have a pivotal fit on the pin 13 having a head section 14 and a stem section 15 that ends in a threaded section 16 as illustrated in FIG. 5. The vertically exposed end plates 17 and 18 which are connected form the frame 19 and have the upper cross member 20 and the spaced lower cross members 21 and 22. The upper portion of the end plates 17 and 18 are provided with filler plates 23 and 24 which have line holes therethrough for the purpose of receiving sleeve bearings respectively for the head section 14 and the stem section 15 of the pin 13. The arms 7 and 8 are within the lower end of the base 1. The arm 7 terminates in a single section carrying the eye 25 for receiving a sleeve bearing for the pin 26. The arm 8 is bifurcated and is provided with two eye members 27 for receiving the pin 28.

Figure 7:
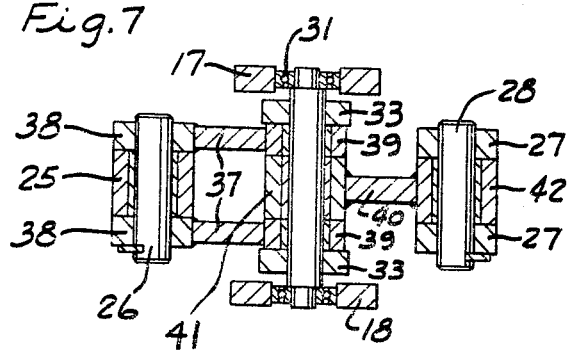
FIG. 7 is a view taken along line 7—7 of FIG. 2.

The lower end of the end plates 17 and 18 are slotted as indicated at 30 to receive the roller bearing members 31 on the ends of the pin member 32. The pin member 32 is carried by the eyes 33 and depend from the head 34 on the end of the piston rod 35 attached to a piston that is operable within the cylinder 36 attached to the under side of the cross plate 20 intermediate the eyes 33. The fluid actuated cylinder 36 has the control fluid lines 29 and 29' connected thereto as shown in FIG. 2. As shown in FIG. 7 the pin 32 carries the connected link members 37 which are provided with the eyes 38 that embrace the pin 26 on opposite sides of the eye member 25 at the bottom of the arm 7. The links 37 are provided with the eyes 39 that embrace the pin 32 and are provided with the sleeve bearings intermediate the eyes 39. The link 40 is provided with the eye 41 and also has a sleeve bearing embracing the pin 32 and other eye 42 of the link 40 is provided with a sleeve bearing to embrace the pin 28 at the bottom of the bifurcated arm 8. This structure illustrated in FIGS. 3, 6, and 7 provides a power means in the form of a double acting piston in the cylinder 36 for forcing the lower ends of the arms 7 and 8 apart thereby causing them to swing on the pivot pin 13 and force their jaws toward each other to clamp the pipe in position as shown in FIG. 2 when the piston rod 35 forces the head 34 downwardly. When the piston rod 35 is moved upwardly it retracts the head 34 and the links 37 and 40 pull the lower ends of the arms 7 and 8 inwardly thereby separating the jaws to allow the pipe member to be lifted therefrom the length of 7 and 8 together with the spreading links 37 and 40 function to provide a materially greater mechanical advantage in clamping the pipe between the jaws 2 and 3 and the operation of the piston to retract the jaws permits them to be opened up considerably even though they are relatively short as compared to the arms 7 and 8. Thus the actuating power means for the chuck jaws is carried by the floating chuck frame 19 between the end plates 17 and 18. The cylinder 36 may be actuated manually to clamp or unclamp the pipe P in the jaws 2 and 3. A switch actuated by the presence of the pipe P may be employed to operate the cylinder 36 to clamp the pipe as a sequential step prior to the operation of the machine tool, not shown, and after the machine tool has completed its operation on the pipe it will automatically retract from the pipe which retraction would reverse the operation of the cylinder 36 to release the work.

As shown in FIGS. 2 and 6 the upwardly open base 1 which is provided with a transverse wall 43, a front wall 44 and a parallel transverse wall 45, the top of which is cut away as indicated in FIG. 2 at 46' in an arcuate manner so as to provide for clearance of the head and the pivot pin 13. The other transverse wall 43 is provided with a removable insert 49 which is independently and removably secured to the arcuate cutaway 46' in the wall 43 and is provided with an enlarged cylindrical bearing ring 46 bolted to the wall 43 and with the partial cylindrical housing 47 the inner end of which has a bearing engagement with the pressure bearing surfaces 48 fastened to the end plate 18 on the frame 19 as shown in FIG. 6. The end of the partially cylindrical pressure bearing surfaces 48 represents the clamping surface between the floating chuck frame 19 and the end of the partial cylindrical housing 47 of the base 1. As shown in FIGS. 3, 5 and 6 clamping is effected by means of the nut 50 which is threadably received on the thread 16 of the pin 13 and is connected to the eye collar member 51 which is provided with an arm 52 that is pivotally connected as indicated at 53 to the piston rod 54 operable in the cylinder 55 the other end of which is pivoted as indicated at 56 to an extension 57 on the floating chuck frame 19. The fluid actuated cylinder 55 is connected at the top and bottom thereof by means of the flexible hose members 91 and 92 for energizing opposite ends of the cylinder to lock and unlock the floating chuck and frame to the base 1. If the cylinder 55 is energized to pull the piston downwardly the nut is rotated in a counterclockwise direction when viewed from the bottom in FIG. 5 which directs the pin 13 toward the nut 50. The cylinder 55 with the piston 54 and the associated parts thereof define a vertically disposed fluid pressure means on the frame to rotate the nut 50 and engage the end of the housing 47, or pressure surface means, against the circular bearing surface 48 to transmit axial locking forces from the frame to the base 1 which forces are applied axially relative to the pin 13 to lock the frame 19 and the jaws 2 and 3 carried thereby. However, the nut 50 is prevented against axial movement toward the pin 13 by means of the roller members 58 which operate between opposed bearing rings 59, one on the nut and one on the insert cylindrical bearing 46 that is secured to the wall 43 of the base 1. If the nut 50 is turned counterclockwise to direct the stem 15, the head 14 is drawn against the collar 10 and clamps this collar with the collar 11, the filler block 24, the frame plate 18, and the pressure bearing surface 48 tightly against the end of the housing 47. Thus a pressure clamping pressure bearing surface 48 is formed between the housing 47 and the end plate 18 for the purpose of locking the frame 19, chuck jaws and work carried thereby against movement relative to the base 1. Thus the cylinder 55 is energized after the threading tool has properly centered the work which it is about to cut and since the threading tools center the work, the work may be clamped in this adjusted position and thereafter will be held there and properly cooperate with the threading or cutting tool. The tools initially line up the work and the clamp will thereafter retain the work in the proper position. Thus the thread will be centered relative to the bore of the pipe or if the exterior of the pipe is to be threaded, the threads will be cut on the O.D. concentrically with the wall surface of the pipe regardless of the eccentricity of the pipe body relative to its axis. The energization of the cylinder 55 to lock the frame 19 to the base 1 may be controlled by a limit switch actuated by the movement of the carriage of cutting tools after an initial cutting by the tools measured by the movement of the tool carriage along the pipe P. A removable screw in the removable insert 49, is in spaced relation with the end of the pin 13 when locked as shown in FIG. 5 and will not restrict the movement of the pin 13.

As shown in FIGS. 2 and 5 one side of the frame 19 is provided with vertical aligned pivoted members 61 and 62 to which is pivotally secured upper and lower parallel links 63 and 64 the other ends of which are pivotally secured to the vertical arms 65 and 66 of the integrally connected cranks 67 and 68. The horizontal arms 69 and 70 and integrally connected cranks are pivotally connected together by verticaly disposed link members 71. The links 63 and 64 are substantially horizontal and permit vertical movement of the frame 19. These links also permit lateral or transverse motion of the frame 19 longitudinally through the link 63 and 64 to the integrally connected cranks 67 and 68 and this lateral motion is maintained equally on the upper and lower integrally connected cranks by means of the vertical link 71.

A bolt 72 is secured to one of the vertically exposed arms such as indicated at 66 of the integrally connected crank 68, and extends through the wall 44 of the base 1 and is provided with a nut means 73 and a spring 74 which preloads the integrally connected crank lever to counterbalance the weight of the link 71 as viewed in FIG. 2. Any movement of the frame 19 that is directed to the pipe that would be away from the wall 44 will increase the tension of the springs 74 so as to require a positive displacement of the floating chuck to insure that the tool is properly engaging the work to adjust it accurately.

The upper and lower integrally connected crank members 67 and 68 are mounted on the pins 75 and 76 which are carried on the inner end of the pivot blocks 77 which pivot blocks are bolted to the formed and finished portion 78 of the wall 44. Thus the finished portion 78 being outside of the base 1 permits the accurate disposition of the axis of the pins 75 and 76 without requiring any finishing work on the interior of the base which is one of the improvements comprising this invention.

As shown in FIG. 5 the links and integrally connected cranks are duplicated and pins 75 and 76 extend through pairs of pivoted blocks 77 and this duplicity prevents any lateral forces on the work from improperly guiding the radial movement of the work during the threading period. Thus when the pin 13 is unlocked the frame 19 may be moved radially in any direction of the axial center.

The frame 19 is provided with outwardly extending brackets 80 and 81, positioned between the horizontal links 63 and 64, and which have a finished under surface for receiving the rollers 82 mounted on the end of the piston rods 83 of the cylinders 84 each of which is connected to the inner surface of the opposite walls 43 and 45 as shown in FIG. 6. These cylinders are constantly charged through the pipe lines 79 and 79' as shown in FIG. 6 from the same source of fluid pressure which is sufficient to apply force through the rollers 82 to the plates 80 and 81, which force is sufficient to counterbalance the weight of the whole assembly of the frame 19 and the load carried thereby in the form of the pipe P. Thus when the frame 19 is floating and the pipe is engaged by the alignment member for aligning the pipe, the force between the alignment member and the pipe does not have to assume any of the weight load of the frame and the pipe while predetermining the axial position of the pipe for threading. This is an important factor of this invention. The fluid pressure charge in the cylinders 84 need be reset only when the pipe load P changes materially since the weight of the end of the pipe supported may be relatively small as compared to the weight of the frame 19.

When the tool is applied to the work it ordinarily approaches the work from the direction as shown in FIGS. 1 and 6. Since the chuck is floating and the pipe is engaged by the alignment member any axial thrust produced by this engagement on the floating work will be transmitted through the clamping surface 48 on opposite sides of the pin 13. However, since the horizontal axis 6 is above the pin 13 and the frame 19 is materially longer than the base 1 a thrust member 85 is provided in the wall 43 which consists of a plate member 86 secured to the wall 43 and having an inward extension 90 that provides a vertical surface 87 to receive pressure from the rollers 88 that are pivotally secured to the plate 89 bolted to the side plate 18 of the frame 19. This does restrict any lateral movement from the bottom of the frame 19 to the base 1 in the same manner as that of the clamping surface 48 even though the nut 50 is not clamped. Thus, the thrust member 85 will prevent the frame 19 from tilting or otherwise becoming misaligned in a vertical plane.

We claim:

1. A floating chuck consisting of a base, a plurality of connected crank levers pivoted on one side of said base and each having a vertical arm and a horizontal arm, a link means pivotally connecting said horizontal arms, a frame supporting a pin means, a pair of work engaging chuck jaws pivotally supported on said pin means carried by said frame, parallel links pivotally connecting said frame and each of said vertical arms, and means carried by said frame to actuate said jaws to clamp the work therebetween.

2. The floating chuck of claim 1 characterized by a fluid activated means attached to said base and engaging said frame to support and counterbalance weight on said frame including the load carried by said chuck jaws.

3. The floating chuck of claim 2 characterized in that said fluid activated means includes a fluid cylinder supporting an upwardly extending piston means, a roller means supported on said piston means, said frame having a substantially horizontal surface engaged by said roller means which supports said frame for vertical and lateral movement over said roller means when the work clamped in said jaws is centered.

4. The floating chuck of claim 1 characterized by a threaded clamp pin having a head engaging said jaws and mounted in said frame and a rotary driven nut to engage said housing when turned on the threaded portion of said pin, and power means on said frame to actuate said nut and clamp said jaws and frame to said base.

5. The floating chuck of claim 4 characterized by a pair of cylinders secured to said base in line with and below said pin, piston means in each cylinder engaging and pivotally supporting said frame at a point intermediate the pivotal connection of said horizontal links.

6. The floating chuck of claim 1 characterized in that said work engaging jaws are mounted on short arms on one side of said pin and have integral long arms extending beyond the other side of said pin to actuate said jaws, and said means to actuate said jaws is connected to said long arms and including a vertically disposed cylinder and piston means, links means pivotally connected to said piston means and to said long arms to force them outwardly and clamp the work in said jaws.

7. The floating chuck of claim 1 characterized by openings in said base, pivot blocks fitted and secured in said openings, and pivot means carried by each pivot block to pivotally support each connected crank lever to said base.

8. The floating chuck of claim 1 characterized by a pressure loaded member connecting said base and at least one of said connected crank arms to preload said floating chuck relative to said base.

9. The floating chuck of claim 1 characterized by a vertically disposed pressure surface means on said base and means on said frame to engage said pressure surface means to transmit axially applied tool forces from said frame to said base.

References Cited by the Examiner
UNITED STATES PATENTS

| | | | |
|---|---|---|---|
| 693,231 | 2/1902 | Carter | 269—32 X |
| 2,932,041 | 4/1960 | Benninghoff | 10—107 |

WILLIAM W. DYER, Jr., *Primary Examiner.*

ROBERT C. RIORDON, *Examiner.*